United States Patent [19]

Day

[11] Patent Number: 5,403,787
[45] Date of Patent: Apr. 4, 1995

[54] EXTRUDED CERAMIC HONEYCOMB AND METHOD

[75] Inventor: J. Paul Day, Big Flats, N.Y.

[73] Assignee: Corning Incorporated, Corning, N.Y.

[21] Appl. No.: 202,440

[22] Filed: Feb. 28, 1994

[51] Int. Cl.⁶ ............................................. C03C 10/12
[52] U.S. Cl. .......................................... 501/7; 501/39; 501/68; 65/33.8
[58] Field of Search ............... 501/5, 7, 9, 32, 80, 501/39, 68; 65/33, 33.8, 33.9

[56] References Cited

U.S. PATENT DOCUMENTS

| | | |
|---|---|---|
| 3,112,184 | 11/1963 | Hollenbach . |
| 3,600,204 | 8/1971 | Beall et al. . |
| 3,790,654 | 2/1974 | Bagley . |
| 3,885,977 | 5/1975 | Lachman et al. . |
| 4,126,477 | 11/1978 | Reade .................. 501/10 X |
| 4,192,665 | 3/1980 | Chyung et al. ........... 501/7 X |
| 4,595,662 | 6/1986 | Mochida et al. .......... 501/17 X |

*Primary Examiner*—Karl Group
*Attorney, Agent, or Firm*—K. van der Steere

[57] ABSTRACT

Extruded low-expansion ceramic honeycombs comprising beta-spodumene solid solution as the principal crystal phase and with less than 7 weight percent of included mullite are produced by compounding an extrusion batch comprising a lithium aluminosilicate glass powder and a clay additive, extruding a green honeycomb body from the batch, and drying and firing the green extruded cellular honeycomb to crystallize the glass and clay into a low-expansion spodumene ceramic honeycomb body.

6 Claims, No Drawings

EXTRUDED CERAMIC HONEYCOMB AND METHOD

The Government of the United States of America has rights in this invention pursuant to Contract No. DEN3-336 award by the U. D. Department of Energy.

BACKGROUND OF THE INVENTION

The present invention relates to ceramic honeycombs for heat regenerator applications. More particularly, the invention relates to ceramic honeycombs which can be manufactured by the extrusion of batches comprising thermally crystallizable glass powders in combination with selected inorganic additives. The resulting honeycombs exhibit high strength and stability under severe thermal cycling such as encountered in combustion engine heat exchanger environments.

A number of processes for the manufacture of cellular ceramic honeycomb bodies have been developed to the point of commercial application. U.S. Pat. No. 3,885,977, for example, describes the production by extrusion of ceramic honeycomb bodies composed of cordierite ($2MgO.2Al_2O_3.5SiO_2$) ceramic material. These honeycombs offer high strength and low thermal expansion, and have accordingly been widely employed as durable substrates for automotive exhaust treatment catalysts.

Ceramic honeycombs have also been produced by laying up sheets of ceramic precursor material into a cellular structure. Thus U.S. Pat. No. 3,112,184 describes the fabrication of ceramic honeycombs for heat exchanger (also called heat regenerator or thermal regenerator) applications wherein flat and corrugated sheets of ceramic material are layered to provide a green ceramic assembly which can be fired to produce a ceramic honeycomb of high cell density.

As noted in U.S. Pat. No. 3,600,204, a preferred ceramic material for heat regenerator applications is a lithium aluminosilicate (LAS) glass powder which, upon firing, is converted by thermal crystallization to a low-expansion ceramic material. Such ceramics, sometimes termed glass-ceramics because they originate from glasses, comprise beta-spodumene or a beta-spodumene solid solution (beta-spodumene s.s.) as the principal crystal phase.

LAS powders and low-expansion beta-spodumene glass ceramics produced therefrom offer a number of advantages for heat exchanger applications, such as ceramic turbine regenerators, wherein thermal cycling of the ceramic is frequent and severe. However, the cost of fabricating such regenerators by lay-up processes is still too high. Therefore, it has been proposed to produce similar products by the extrusion of high-cell-density ceramic honeycombs.

The extrusion of glass powders, however, presents several problems. Among these problems are the relatively low packing density of the glass powders, resulting in a need for higher levels of organic binders in glass-powder-based extrusion batches in order to successfully extrude complex shapes. As a consequence, attempts to produce products by the extrusion of glass powder batches have not been successful, due to the very high firing shrinkages incurred.

High firing shrinkages would present particularly difficult problems in the production of thin-walled honeycomb structures by extrusion. Among such problems are a higher risk of distortion of the structure during sintering, and a higher incidence of cracking defects in the product. In addition, larger dies would be required to produce the oversize green honeycombs needed for the final product, and dies for the extrusion of large honeycombs are particularly difficult to fabricate.

SUMMARY OF THE INVENTION

In accordance with the present invention a method for producing extruded cellular honeycomb ceramics of low thermal expansion from thermally crystallizable lithium aluminosilicate glass powders is provided. That method enables the production of beta-spodumene ceramic honeycombs with reduced firing shrinkage, and therefore with improved retention of a fine, defect-free cell structure in The fired, crystallized ceramic honeycomb body.

In a first aspect, then, the invention includes a method for making a low-expansion ceramic honeycomb body of beta-spodumene composition. In accordance with that method, the extrusion batch compounded for honeycomb extrusion comprises a solids component which includes, in addition to a thermally crystallizable lithium aluminosilicate glass powder, a clay batch additive which is effective to significantly improve both the extrusion characteristics and the subsequent processing behavior of the batch.

In addition to the solids component of the batch, a vehicle component for imparting an extrudable consistency to the batch will also be provided. This vehicle may be conventional, and will typically comprise one or more liquids and one or more organic and/or inorganic binders and extrusion aides of the types known to be useful for the extrusion of powdered ceramics.

After compounding, the batch is extruded through a honeycomb extrusion die to produce a green extruded cellular honeycomb, following conventional practice. Advantageously, due to the incorporation of the clay additive to the batch, extrusion can be accomplished without the need for excessive vehicle additions to the batch.

The green extruded cellular honeycomb produced by extrusion is thereafter dried to remove evaporable vehicle components, and then fired. Firing comprises heating the honeycomb to a temperature at least sufficient to fuse the glass powder and clay together into a unitary body and to crystallize the clay/glass mixture, thereby converting the body into a low-expansion ceramic honeycomb product.

In a second aspect, the invention comprises an extruded ceramic honeycomb body made by the method hereinabove described. That honeycomb product will preferably be composed of a lithium aluminosilicate ceramic, exhibiting a low coefficient of thermal expansion and comprising a principal crystal phase composed of beta-spodumene solid solution.

The thermal expansion of an extruded honeycomb provided in accordance with the invention will typically not exceed about $15 \times 10^{-7}/°C.$, and more preferably will be in the range of about $0-8 \times 10^{-7}/°C.$, both being determined as an average thermal expansion coefficient over the temperature range of room temperature (R.T.) to 800° C. This result can be achieved by appropriate selection of glass powder and clay additives for the batch which will maximize the amount of beta-spodumene solid solution, and minimize the development of higher expansion crystalline phases such as mullite, in the fired honeycomb ceramic body.

Extruded LAS ceramic honeycombs provided in accordance with the invention are designed to provide thermal durability substantially equivalent to that of laid-up or wrapped beta-spodumene ceramic regenerator structures. However, they can be produced by extrusion in significantly higher volumes, at substantially reduced cost, and with much greater cell size and shape uniformity. Therefore, the wider use of this unique group of ceramic materials for thermal regenerator applications becomes practical.

DETAILED DESCRIPTION

The invention has potential application to the production of extruded honeycomb bodies from a wide variety of different silicate glass compositions. However, as the preferred glasses for the production of low-expansion ceramic honeycombs for heat regenerator applications are lithium aluminosilicate glasses, the following description focuses primarily on these glasses as best illustrating the invention.

Among the glasses which have been particularly preferred for manufacturing ceramic heat regenerators are those lithium aluminosilicate glasses which can be thermally crystallized to yield highly crystalline ceramics containing beta-spodumene ($Li_2O.Al_2O_3.4SiO_2$) and/or solid solutions thereof as the principal crystal phase. In beta-spodumene ceramics of this well known type (also termed "glass-ceramics" since the crystals are developed from a parent glass), the beta-spodumene crystals are in solid solution with silica in proportions as high as $Li_2O.Al_2O_3.9SiO_2$. Advantageously, even in these higher silica ranges the advantageous characteristics of low thermal expansion, high thermal shock resistance, and good temperature cycling stability demonstrated by the resulting ceramic products are largely retained.

In the final extruded ceramic honeycomb products, the preferred range of composition, expressed in terms of the constituent oxides of the crystallized honeycomb product is about 3.5–7.5% $Li_2O$, 15–30% $Al_2O_3$, 65–85% $SiO_2$, and 0–3% $TiO_2$ as an optional nucleating agent. The mole ratio of $Al_2O_3:Li_2O$ in the product should be in the range of about 1.0–1.5 for the most highly crystallizable compositions.

In the prior art, glasses within this preferred composition range have been used directly as the starting materials, whereas in the practice of the present invention, the glass constitutes only one portion of the solids component of the batch. Therefore, depending upon the amount of clay additive to be used in the extrusion batch, the composition of the glass powder may if desired be suitably adjusted to bring the net composition of the solids component of the batch (glass plus additives) into this preferred range.

Some specific examples of lithium aluminosilicate glasses known to be thermally crystallizable to beta-spodumene ceramics, and which can be used directly in the practice of the invention if desired, are reported in Table I below. The compositions in Table I are set out in weight percent on the oxide basis; glasses of these compositions can readily be prepared from batches of oxides or other compounds which, on being melted together, will be transformed into a glass melt having an oxide composition as reported in the Table. The melting of these glasses is suitably carried out in crucibles or other glass melting apparatus at temperatures of 1550–1650 C.

TABLE I

| | Glass Compositions | | | | | | |
|---|---|---|---|---|---|---|---|
| | 1 | 2 | 3 | 4 | 5 | 6 | 7 |
| $SiO_2$ | 72.6 | 72.5 | 70.5 | 69 | 66.8 | 65 | 78.5 |
| $Al_2O_3$ | 22.5 | 22 | 23 | 25.2 | 26.5 | 28.5 | 16.6 |
| $Li_2O$ | 4.9 | 5.5 | 6.3 | 5.8 | 6.7 | 6.5 | 4.9 |

Powders of glasses having compositions such as above described can be prepared by dry-gaging the glass melts or crushing patties of the glass, and then grinding the resulting particulate glass to the desired particle size. For powder extrusion processing in accordance with the invention, particle sizes in the 10–20 $\mu m$ range are suitable.

Among the clay additives which can be successfully employed in the production of extruded beta-spodumene are aluminosilicate clays such as the kaolinitic clays. Although containing measurable levels of a number of impurities, these clays are substantially entirely of aluminosilicate composition. Therefore, they can be added to powdered lithium aluminosilicate glass extrusion batches without introducing objectionable proportions of extraneous metals or metal oxides into the compositions.

Useful clay additions will range from as little as 2% to as high as 30% by weight of the solids component of the batch. The preferred range of additions, however, will be in the 5–20% range by weight.

As previously noted, the vehicle component of the extrusion batches for the beta-spodumene honeycombs can be conventional, and will typically comprise a combination of liquid and organic binder components imparting both an extrudable consistency and good green strength to the compounded batch. The liquid components of the vehicle can be inorganic, i.e.., consisting largely of water, or they can be organic. The use of water is preferred, although evaporable organic liquids such as the lower alkanols can be wholly or partly substituted therefor as desired.

The organic components of the vehicle will comprise organic binder, plasticizer and/or extrusion aides such as are conventional for ceramic powder extrusion. Most preferably, these will include at least one cellulosic binder, such as methyl cellulose, hydroxypropyl methyl cellulose or the like, and at least one lubricant, such as a sodium, ammonium, or diglycol stearate.

Mixing is conventionally carried out in a muller-mixer. Thereafter the batches can be extruded in accordance with conventional honeycomb extrusion practice. Such will typically involve extrusion through a honeycomb extrusion die of the type described in U.S. Pat. No. 3,790,654, or other similar equipment.

Preliminary drying of the green extruded honeycombs is beneficial since it facilitates the removal of the bulk of evaporable (liquid) vehicle components at a controlled rate, such that cracking of the extruded green honeycomb can be avoided. Suitable drying temperatures will be those generating liquid vapor pressures near or slightly above ambient. Thus, the drying of green honeycombs comprising largely aqueous binders will typically be in the 90–120° C. temperature range at atmospheric pressure.

The firing of the green honeycombs to achieve binder burnout and subsequent sintering and crystallization of the glass and clay components thereof will be at peak temperatures at least sufficient to achieve complete crystallization of the glass powder/clay mixture employed. Complete crystallization of the clay-glass mixture is needed in order to assure thermal stability in the resulting phase assemblage. In general, heating of the green honeycomb to peak temperatures in the 1000–1350° C. temperature range will be sufficient for this purpose, with lower temperatures risking incomplete beta-spodumene crystal development and higher temperatures promoting honeycomb deformation in the resulting ceramic product.

Extruded ceramic honeycombs provided in accordance with the invention will comprise beta-spodumene solid solution as the principal crystalline phase. Minor siliceous crystalline phases such as mullite will normally also develop, and in fact such development is more likely in the presence of clay additives in the green honeycomb structure.

Nevertheless, surprisingly and notwithstanding the presence of a significant clay fraction in the starting material, the proportion of mullite and other relatively high expansion crystal phases in the beta-spodumene ceramics produced as above described can generally be held below about 7% by weight. The beneficial consequence of this finding is that the thermal expansion coefficient of these extruded honeycombs can be held below $15 \times 10^7/°C.$, a level which is expected to be quite adequate for use in a honeycomb heat regenerator.

In addition to low thermal expansion, the extruded honeycombs of the invention offer significant structural advantages over the prior art wrapped honeycomb structures. Hence, in addition to reasonably high cell densities (at least 200 cells/in$^2$ of honeycomb open frontal area), the extruded honeycombs offer a regular quadrilateral or triangular cell structure with substantially uniform wall thickness. This structure avoids the irregular sinusoidal cell configurations characteristic of wrapped structures. Projected advantages of the more uniform cell structure include the avoidance of localized high thermal stresses typically associated with localized or uneven heating, and more uniform heat exchange characteristics leading to better overall heat transfer efficiency.

The invention may be further understood by reference to the following examples, which are intended to be illustrative rather than limiting.

EXAMPLE 1

Several extrusion batches based on a powdered thermally crystallizable lithium aluminosilicate glass were prepared. In each case, the powdered glass used was a glass having the composition of Example 1 from Table I above. The average particle size of the glass used was about 15 μm.

Each of the batches prepared from this glass included a clay batch additive, in a proportion of 10 or 20% of clay by weight calculated on the basis of the total inorganic solids component of the extrusion batch. The composition of the resulting solids component of each of the batches was as follows:

TABLE II

| | Extrusion Batches | | |
|---|---|---|---|
| Example | Clay type | Clay addition (% wt.) | Glass Powder (% wt.) |
| 1 | kaolin I | 10% | 90% |
| 2 | kaolin I | 20% | 80% |
| 3 | kaolin II | 10% | 90% |
| 4 | kaolin II | 20% | 80% |

Added to each of these clay/glass mixtures to compound the final extrusion batches was a water-based vehicle. The vehicle components, in addition to water, included a methyl cellulose binder, a lubricant, and a small amount of fired (crystallized) glass. The crystallized glass, while not required, is often included in glass powder formulations to serve as a "seed" material for promoting more extensive and homogeneous beta-spodumene crystallization of the glass and clay during final firing of the products, thereby minimizing crystal grain growth. As is well known, similar effects can be induced by incorporating $TiO_2$ or other agents in the glass.

Clay additive kaolin I was Hydrite MP ™ kaolin clay, sold by the Dry Branch Kaolin Company, while clay additive kaolin II was Kaopaque- ™ kaolin clay, also sold by the Dry Branch Kaolin Company. The binder used was A4M Methocel ® powder, purchased from the Dow Chemical Company, Midland, Mich., this binder being added in a proportion of 10% by weight of the final extrusion batch. The extrusion aide was sodium stearate, added in a proportion of 0.75% by weight of the final batch. The crystallized "seed" glass, added in a proportion of about 0.2% by weight of the final batch, had the same composition as the LAS glass powder component used in these batches.

Each extrusion batch thus provided was blended and compounded in a Brabender ™, and then extruded through a die to provide green rod samples. The green rod sample were then dried and fired, with drying being conducted for 48 hours at 100° C. The firing process comprised an exposure to a peak crystallization temperature of about 1300° C. for a period of about 10 hours, to insure complete crystallization of the glass/clay blend.

The extrusion characteristics of the batches produced as above described were excellent; reductions in organic binder component appeared quite feasible due to the effectiveness of the clay additive in promoting plasticization of these batches. Also good were the drying and firing characteristics of the green extruded samples.

Surprisingly, the increases in thermal expansions observed in the ceramics produced from these extrusions were well within a range acceptable for heat regenerator use. Thus, thermal expansion increases over expansion values typical of clay-free crystallized LAS materials of the same composition were in the range of about 0.1–0.5 ppm/C. In general, the larger expansion increases were observed at the higher clay addition levels.

X-ray analysis of the fired extruded ceramics produced as described showed some mullite present in all samples. However, based on the very limited expansion increases observed for the various compositions, mullite development in the 10% clay/glass crystallized samples was calculated to be below 2% of mullite by weight of the crystallized material. In fact, even in the higher range of 20% clay additions to these ceramics, mullite levels not exceeding about 7% by weight of the ceramics were projected.

As previously noted, the addition of an aluminosilicate clay to a powdered LAS glass of spodumene stoichiometry to form the extrusion batch will shift the net composition of the inorganic solids batch component away from the spodumene-spodumene solid solution composition join. To compensate for this shift, it can be desirable, particularly in the case of relatively large clay additions, to adjust somewhat the composition of the powdered glass component of the batch, in order to bring the composition back toward a spodumene stoichiometry.

Table III below sets forth examples of lithium aluminosilicate glass compositions wherein the levels of silica, alumina, and lithia in the glasses have been adjusted to compensate in large part for the addition of a kaolin clay to the batch. Included in Table III for each of the series of glass compositions set forth are proportions for each of the oxide components of the LAS glass, given in parts by weight (and totaling about 100 parts to approximate weight percent). Also reported for each glass is a proportion of clay addition which, if present in a batch containing the glass and the indicated addition of clay, would produce a stoichiometric or near-stoichiometric beta-spodumene s.s. crystal phase upon crystallization of a powdered glass/kaolin clay batch of the composition described.

TABLE III

| Comp. No. | $Li_2O$ | $Al_2O_3$ | $SiO_2$ | $TiO_2$ | Clay Addition (wt. %) |
|---|---|---|---|---|---|
| 1 | 5.24 | 21.8 | 72.9 | — | 5% |
| 2 | 5.54 | 20.5 | 73.9 | — | 10% |
| 3 | 5.85 | 19.0 | 75.0 | — | 15% |
| 4 | 6.22 | 17.3 | 76.3 | — | 20% |
| 5 | 6.63 | 15.5 | 77.8 | — | 25% |
| 6 | 7.08 | 13.3 | 79.5 | — | 30% |
| 7 | 4.71 | 16.7 | 77.5 | 1.0 | 5% |
| 8 | 4.99 | 15.3 | 78.7 | 1.0 | 10% |
| 9 | 5.29 | 13.5 | 80.2 | 1.0 | 15% |
| 10 | 5.62 | 11.5 | 81.8 | 1.0 | 20% |
| 11 | 5.98 | 9.27 | 83.7 | 1.0 | 25% |
| 12 | 6.29 | 6.69 | 85.9 | 1.0 | 30% |

As will be apparent from the foregoing examples, adjustments to the composition of the powdered glass to move the final composition of the extruded honeycomb toward a beta-spodumene s.s. composition generally requires at least some increase in lithia content, and often some increase in silica content, to balance the relatively high alumina content of the clay additive. Thus the preferred glass compositions for this use will typically fall in the range of about 4.9–7.1% $Li_2O$, 6.5–22.0% $Al_2O_3$, 72.0–86.0% $SiO_2$, and 0–2% $TiO_2$ by weight. Of course, numerous other oxides may also be present in the glass, provided they do not adversely affect the crystallization behavior thereof in the extrusion mix.

While the invention has been particularly described above with respect to specific examples of compositions, materials, apparatus and/or procedures, it will be recognized that those examples are presented for purposes of illustration only and are not intended to be limiting. Thus, for example, the addition of other finely particulate ceramic materials to the glass powder extrusion batch, in addition to or in partial substitution for the clay additive, could be useful, provided such additives do not reduce the packing density of the solids or otherwise interfere with the extrusion or subsequent crystallization processes. It will therefore be apparent that numerous modifications and variations upon the compositions and processes specifically described herein may be resorted to by those skilled in the art within the scope of the appended claims.

We claim:

1. A method for making a low-expansion ceramic honeycomb body of lithium aluminosilicate composition which comprises the steps of:
   compounding an extrusion batch comprising a solids component and a vehicle component, the solids component comprising a lithium aluminosilicate glass powder and a clay additive;
   extruding the batch through a honeycomb extrusion die to produce a green extruded cellular honeycomb; and
   drying and firing the green extruded cellular honeycomb to produce a low-expansion ceramic honeycomb body, said honeycomb body having an average thermal expansion coefficient (R.T.−800° C.) below $15 \times 10^{-7}/°C$. and a principal crystal phase composed of beta-spodumene solid solution.

2. A method in accordance with claim 1 wherein the clay additive is an aluminosilicate clay comprising 2–30% by weight of the solids component of the batch.

3. A method in accordance with claim 2 wherein the clay additive is a kaolinitic clay comprising 5–20% by weight of the solids component of the batch.

4. A method in accordance with claim 3 wherein the silicate glass powder is a lithium aluminosilicate glass powder consisting essentially, in weight percent, of about 4.9–7.1% $Li_2O$, 6.5–22.0% $Al_2O_3$, 72.0–86.0% $SiO_2$, and 0–2% $TiO_2$.

5. A method in accordance with claim 3 wherein the solids component of the batch has a composition consisting essentially, in weight percent, of about 3.5–7.5% $Li_2O$, 15–30% $Al_2O_3$, 65–85% $SiO_2$, and 0–3% $TiO_2$, the mole ratio of $Al_2O_3:Li_2O$ in the solids component being in the range of about 1.0–1.5.

6. A method in accordance with claim 3 wherein the green extruded cellular honeycomb is fired to a temperature at least sufficient to completely crystallize the clay and powdered glass.

* * * * *